March 29, 1927.

C. S. ASH 1,622,268

METHOD OF CONSTRUCTING SUSPENSION WHEELS

Filed May 11 1925  3 Sheets-Sheet 1

Inventor
Charles S. Ash,
By
Attorneys

March 29, 1927.   1,622,268
C. S. ASH
METHOD OF CONSTRUCTING SUSPENSION WHEELS
Filed May 11, 1925   3 Sheets-Sheet 2

Inventor
Charles S. Ash,
By
Attorneys

March 29, 1927.
C. S. ASH
1,622,268
METHOD OF CONSTRUCTING SUSPENSION WHEELS
Filed May 11, 1925  3 Sheets-Sheet 3
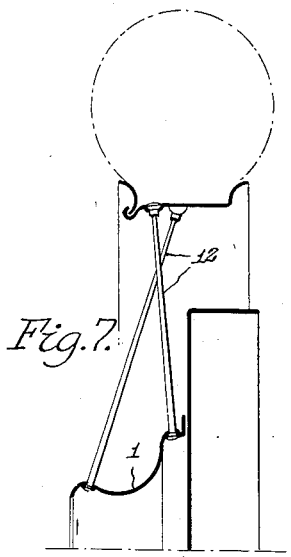
Fig.7.
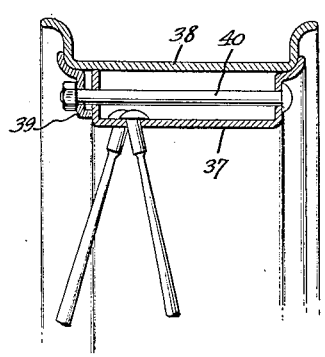
Fig.6.
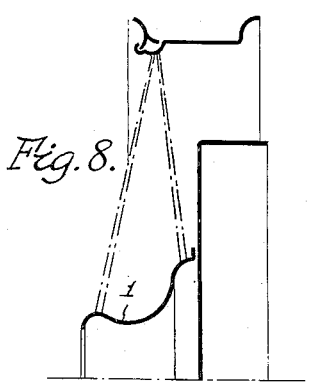
Fig.8.
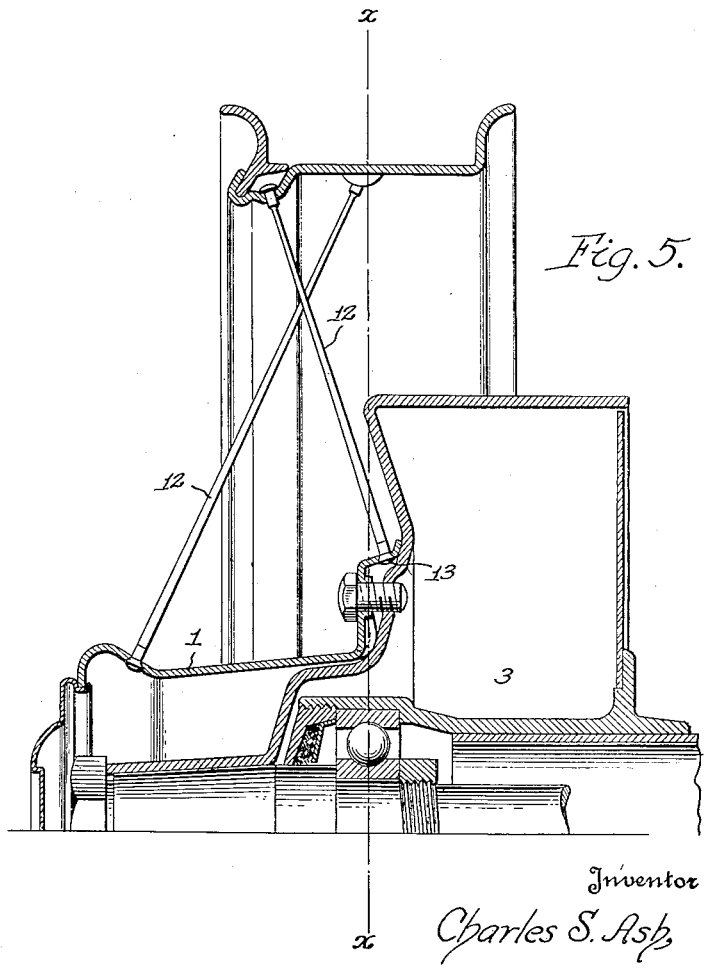
Fig.5.
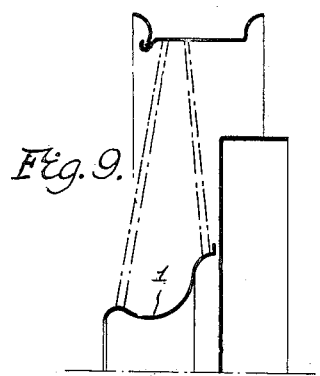
Fig.9.
Inventor
Charles S. Ash,
By 
Attorneys Patented Mar. 29, 1927.

1,622,268

UNITED STATES PATENT OFFICE.

CHARLES S. ASH, OF ROYAL OAK, MICHIGAN.

METHOD OF CONSTRUCTING SUSPENSION WHEELS.

Application filed May 11, 1925. Serial No. 29,633.

In tension or suspension wheels as commonly constructed, the wire spokes are under uneven tension or strains, due to the manner of assembling such wheels, first, in that it is the universal practice to eliminate imperfections in the stock rim, by adjustment of spoke tension, that is, if the rim is slightly out of round, has high spots, or is laterally distorted, such imperfections are corrected by tightening certain spokes, but such adjustment in spoke tension puts a greater strain upon certain spokes than upon others; and, secondly, the present practice of lacing the spokes into the rim at both sides of its central plane, precludes offsetting the rim laterally a sufficient amount to make it interchangeable with other types of wheels and at the same time give the necessary proportion between spoke angle or inclination and number of spokes in each row, to provide even strains in all of the spokes under load and service conditions. An over strain in one row due to wrong proportions may cause breakage of spokes or wheel distortion, and to overcome these defects, such wheels have been constructed with a greater number of spokes than would otherwise be necessary, increasing the weight and cost of such wheels. Wire wheels which are not exactly interchangeable with other types,—not giving the same standard width of tread,—are not desirable under most conditions of use, and it is because of these several defects in wire wheel construction that this type of wheel has not come into more general use.

It is an object of the present invention to produce a wire wheel which will compete in cost of manufacture, with wood and disk wheels, and will be interchangeable with such wheels, maintaining standard tread conditions. It is also an object to provide a wire wheel having a laterally offset rim with the spokes so proportioned and arranged relative to their lateral inclination and so laced into the rim as to produce like tension in all spokes and give an even distribution of strains. A further object is to provide a construction and method of assembly whereby like initial tension is insured in all of the spokes and spoke tension adjustments in the finished wheel may be dispensed with, thereby facilitating assembly and cheapening the construction.

A further object is to secure the several advantages inherent in the method of assembly, whereby the rigid, permanent attachment of spokes to hub and rim is facilitated and the employment of electricity as a heating medium is made possible and the terminals of all spokes simultaneously heated and then formed down by a simple operation, to rigidly and permanently attach the same to the hub or rim. It is an object of the present method to facilitate assembly and make possible a wire wheel construction wherein the spokes are under equal tension and maximum strength is secured with a minimum of weight and number of parts.

With the above and other ends in view the invention consists in the wheel structure and method of constructing the same, all as hereinafter set forth and more particularly pointed out in the appended claims, reference being had to the accompanying drawings, in which:—

Fig. 5 is a sectional view of a portion of a hub mounting with a portion of a finished wheel embodying the present invention in place thereon, to illustrate the offsetting of the rim relative to the attachment of the spokes thereto;

Fig. 6 is a sectional detail showing a modified construction of wire wheel with a demountable rim mounted thereon; and Figs. 7, 8 and 9 are diagrammatic views of modified forms of spoke lacings which may be employed in building wheels in accordance with the method and construction embodying the present invention.

Figure 1:
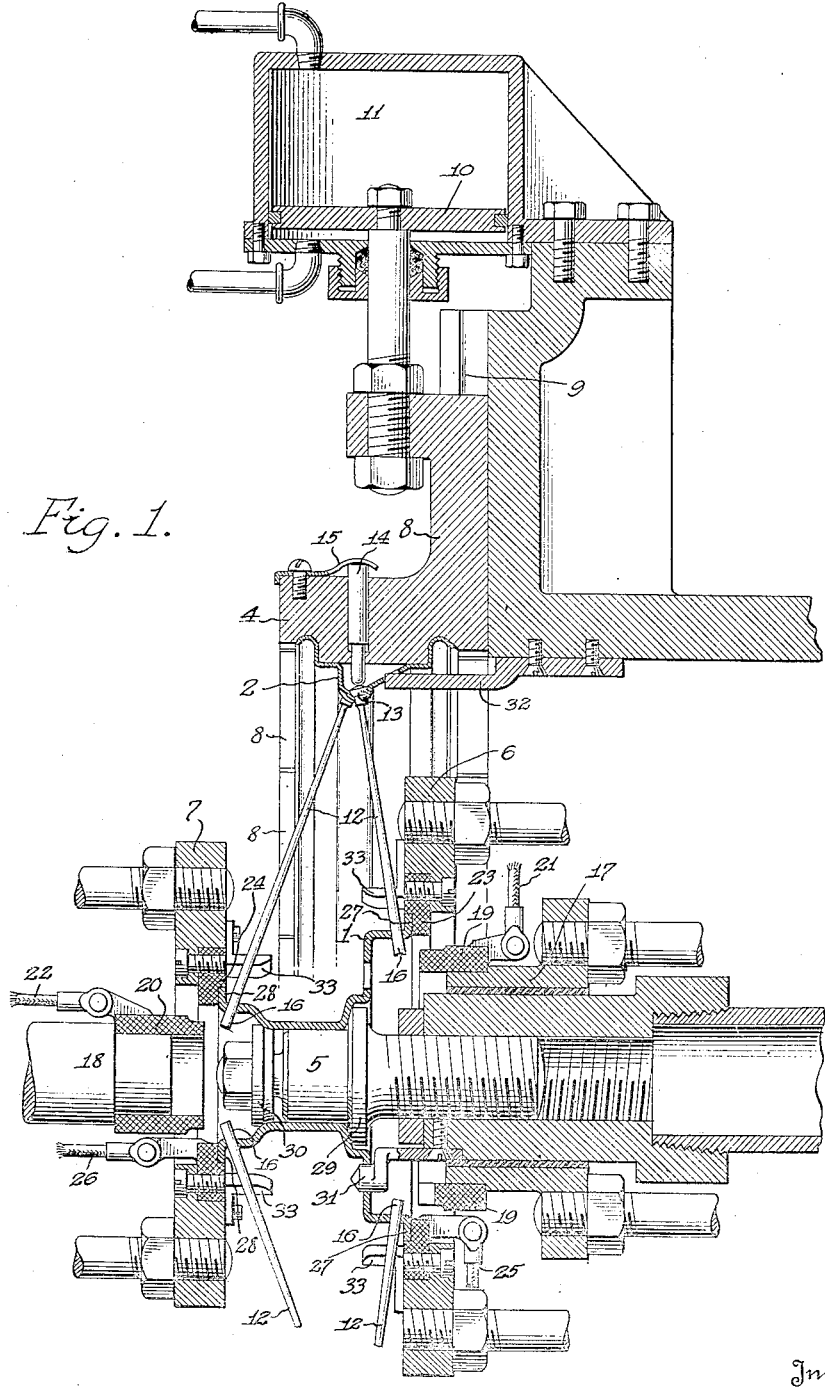
Figure 1 is a sectional view of a portion of a machine or mechanism illustrative of suitable means for use in building wheels embodying the present invention and in accordance with the method involved therein.

The primary requirement in a wire or suspension wheel is equal tension in all spokes. This determines the ultimate strength of the wheel as the entire load is carried in suspension by the spokes and, therefore, unless such even tension is secured and maintained in service, it is dangerous to offset the center line of the rim with reference to the line of attachment of the spokes thereto, as has been the common practice in order to make wire wheels, as nearly as possible, interchangeable with disk and wood wheels without altering the gauge or width of track of the vehicle.

It has not been practical in the past to provide wire wheels with demountable rims, for the reason that the method of assembly practiced has produced wheels, the felloes of which were not true and did not afford perfect seating for rims and such wheels have not been sufficiently stable to permit the use of demountable rims, as the mounting of such a rim was very liable to further strain an already overstrained spoke and cause breakage. Due to this defect in even tension, wire wheels have never been completely interchangeable with other types, that is, the change from wood or disk wheels to wire wheels has always increased the vehicle tread width, and this defect in even spoke tension has been due to the method of assembly practiced, wherein defects in stock rims were sought to be corrected by adjustment in spoke tension. This old method necessitated the employment of means for providing initial individual spoke adjustment, as well as such adjustment after the wheel had gone into service, thus increasing the cost of manufacture and weight of wheel. In order to provide a factor of safety to take care of this danger arising from unequal spoke tension, it has been the practice to increase the number of spokes, and in some wheel constructions, an additional row or rows of spokes has been employed, further increasing cost and weight without eliminating the causes of the trouble. Further, under the old method, it was necessary, in order to correct all defects in stock rims, to lace the spokes into the rim at each side of the center line of the rim so that the strain of the spokes would be distributed throughout the width of the rim to pull it into proper concentric relation to its axis of rotation and to its plane of rotation. This lacing at each side of the center line of the rim, prevented the offsetting of the rim relative to the load plane of the hub, sufficiently to make wire wheels interchangeable as to gauge or vehicle tread width, with other types of wheels, and any offset attempted, further increased inequality in spoke tension.

It is obvious, however, that if the rim be perfectly true and concentric and the tension be equal on all spokes with the number of spokes in each row properly proportioned to the inclination of the spokes in that row, all load strains, both lateral as well as vertical, will be evenly distributed on all of the spokes and said spokes may be laced into the rim at one side of the center of the rim to any extent desired and thus give an offset to the rim sufficient to permit of interchanging wire with other types of wheels without change in width of vehicle tread and the finished wheel will have sufficient strength and rigidity to permit of the use of a demountable rim. The desideratum in suspension or wire wheels is, therefore, even distribution of strains, both load and lateral, over all spokes under all conditions of use, together with rim accuracy, and this desideratum is secured in a wire wheel embodying the present construction and assembled in accordance with the present method.

Figures 2, 3, 4:
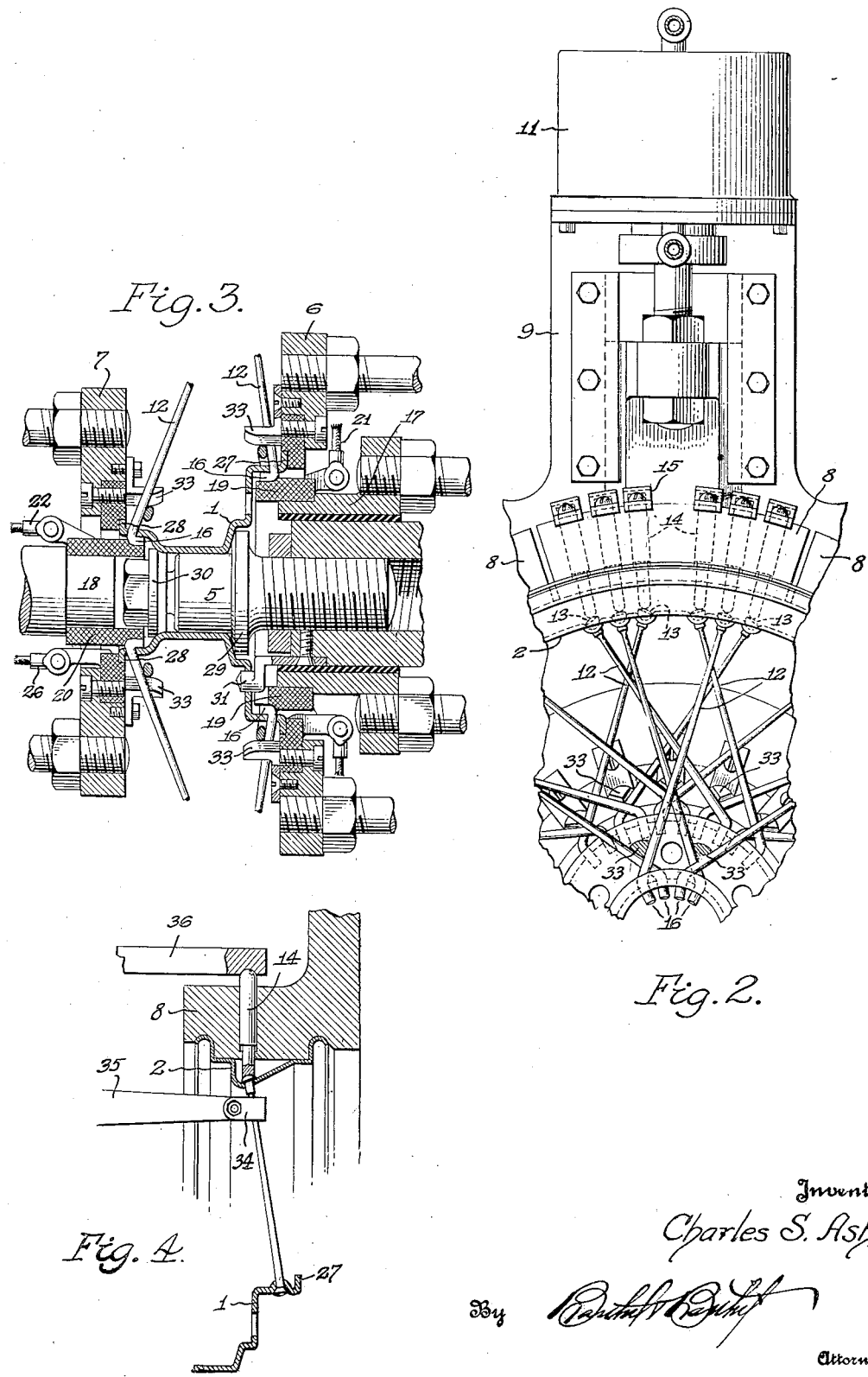
Fig. 2 is a front end elevation of a portion of the same with parts omitted to more clearly show the wheel in place thereon; and illustrate steps of the method.
Fig. 3 is a sectional view similar to Fig. 1, showing the central or hub holding portion, with parts of the mechanism moved to position to perform the step of securing the wheel spokes to its hub.
Fig. 4 is a sectional detail illustrative of a modified arrangement for performing the step of securing the outer ends of spokes to a rim, included in the present method.

Any suitable means may be employed in the construction and assembly of wire wheels embodying the present invention and in accordance with the present method, but as illustrative of means suitable for the purpose, a mechanism is shown in Figs. 1 and 2 of the accompanying drawings wherein the wheel hub shell 1 and wheel rim 2 which may be of any suitable form, are held in proper concentric relation with the rim in proper relation to the load plane of the hub 3 (Fig. 5) upon which the wheel is to be mounted, by a suitable outside or rim-chuck indicated as a whole by the numeral 4 and a suitable support for the hub shell, such as a spindle 5 or movable hub-chuck members 6 and 7. The outside or rim-chuck 4 is preferably interiorly formed to conform to the cross-sectional shape of the rim 2 so that portions of the chuck will fit into the channel of the rim when the chuck is contracted, and thus straighten and hold the rim in exact concentric relation to the axis of the hub shell, said chuck comprising segments 8, all being movable simultaneously and radially inward upon a guide 9, there being a guide for each segment. These segments are moved inwardly upon their guides, by any suitable means, preferably power means, such as a piston 10 connected to each segment and movable within a cylinder 11 under fluid pressure within the cylinders so that sufficient force may be applied to the rim to contract it slightly in diameter and cause it to seat accurately within the formed inner side of the chuck, thus straightening the rim and forming down any high spots or other imperfections, shaping the rim to the exact desired shape and holding it in this condition and slightly contracted, also in exact concentric relation with the axis of the hub shell and in proper relation to the central load plane of the finished wheel.

Previous to or after the chucking of the rim and shell, the several spokes 12 are threaded into openings in the rim and shell with the heads 13 on the spokes seated in seats formed in the rim as shown in Fig. 1, or in seats formed in the shell as shown in Figs. 4 and 5 with their opposite plain ends engaged within the proper openings provided therefor in the hub or rim according to the manner in which the spokes are placed.

When the spokes are placed as shown in Fig. 1, with their integral heads 13 engaging seats in the rim, movable plungers 14 are preferably provided in openings in the segments 8 of the rim chuck 4, one opposite the head of each spoke, and these plungers are preferably moved inward by any suitable means, such as springs 15, to engage the heads and force them firmly to their seats. The spokes are of such a length that the inner or plain end portions 16 will project a short distance through the openings therefor in the shell which is properly shaped and flanged to receive these ends of the several rows, there being illustrated two rows of spokes, one engaging openings adjacent the outer end of the shell 1 and the other engaging openings in a flange at the inner end of the shell in order to give the necessary relative angle to the two rows to brace the wheel against lateral strains, the several spokes of either or both rows being laced tangentially into the shell, as shown in Fig. 2, as is the common practice, to take torque or driving strains.

After these spokes have been so laced and while so held by the rim chuck with the rim in contracted condition, the inner ends of the spokes may be formed into close contact with the shell to rigidly secure them thereto, and this forming operation may be quickly and efficiently performed by moving the formers 17 and 18 into the ends of the shell, said formers being provided with formed electrical terminal members 19 and 20, to which are connected electrical conductors 21 and 22, and these formers may be simultaneously moved inward to bring their formed inner ends into engagement with the inwardly projecting ends of the spokes and form or clinch these ends over into firm contact with the surface of the shell. This clinching or forming operation is preferably aided by heating these inner ends of the spokes, and such heating may be advantageously secured through the employment of an electric current which is caused to pass through these spoke ends when these former heads or terminals 19 and 20 contact the inwardly projecting ends of the spokes, the circuit being completed by providing contact rings 23 and 24 on the hub-chuck members 6 and 7 to contact the ends of the hub shell 1 adjacent the openings through which the spoke ends pass and connecting circuit wires 25 and 26 thereto, to provide an electric circuit at the outer end of the shell by way of the wire 22, terminal or forming head 20, inwardly projecting spoke ends and adjacent portion of the hub shell, the ring terminal 24 and wire 26. A circuit is formed in a like manner at the inner end of the shell by wire 21, former terminal 19, spoke ends 16 and adjacent portion of the shell, ring terminal 23 and wire 25.

Thus all of the spokes may be simultaneously electrically heated and "hot clinched" at the hub, and a permanent rigid connection of all the spokes to the shell effected in a single operation, if so desired, or all of those at one end of the hub first clinched and then those at the opposite hub end.

The hub-chuck members 6 and 7 are supported with their common axis coincident with the hub shell axis and guided in any suitable manner (not shown) to move toward the hub shell ends, and these members may be moved simultaneously or independently by any suitable means (not shown). The ring terminal or contact members 23 and 24 are preferably recessed slightly to receive the end flanges 27 and 28 on the hub shell and by making this recess of a diameter equal to the external diameter of these end flanges, the shell may be accurately centered and held by the hub-chuck members 6 and 7 and it may be found that center supporting shaft or spindle 5 may be dispensed with, but as shown, this spindle 5 is formed to fit closely within the shell and is provided with a shoulder 29 and detachable head 30 to locate and hold the shell relative to the rim 2. A pin 31 is provided on the fixed support for the spindle 5 to engage an opening in the shell and properly locate and hold the hub shell against rotation relative to the rim 2, which rim is held and located in a like manner relative to the shell by an arm 32 (see Fig. 1) on the fixed support for the segments 8, to engage the valve stem opening in the rim 2.

In the tangential arrangement of spoke lacing as shown in Fig. 2, the hub ends 16 of the spokes of each row cross each other, and to prevent these ends of the spokes from moving outwardly in the openings in the shell and to hold them firmly in place in said openings while the ends are being formed over by the formers, means is provided for engaging within the angles at the crossing of the spokes, and as shown, such means consists of fingers 33, shown in Figs. 2 and 3, carried by the hub-chuck members 6 and 7 and movable therewith.

When the spokes are positioned, as illustrated in Fig. 4, with their heads 13 engaged in seats in the shell 1, the outer plain ends of the spokes may, in a like manner, be "hot clinched" or riveted down upon the rim by means of the plungers 14 serving to form down or rivet these ends onto their seats on the rim, and such forming operation may be assisted by heating the spoke ends electrically in a manner similar to that illustrated for heating the ends when they are to be "hot clinched" in the shell, in this instance the plungers 14 being employed as one electrode, and the other electrode or connection 34 being clamped to the spokes. Each connection 34 for each spoke is carried by an arm 35 to which the electrical conduit (not shown) is attached, and this connection serves to hold the spoke end outwardly within its opening in the rim 2 against the forming pressure applied to the plunger 14 by any suitable means, such as an arm 36 engaging the outer end of the plunger and to which arm the other wire (not shown) of the circuit may be connected, the arm 36 being moved by power, in any suitable manner to force the plunger inward and form the head upon the end of the spoke projecting through the rim and heated by the passage of current through this portion of the spoke.

In Fig. 6 a wheel construction is shown wherein the spokes are connected at their outer ends to a felloe band 37 of any suitable construction, and a demountable rim 38 is mounted upon this felloe and detachably held in place by a detachable side ring 39 and a bolt or bolts 40 in the usual manner. By reason of the construction of the present wheel and the method of its assembly, such felloe and demountable rim may be employed, for the reason that the spokes are all under even tension and the felloe is permanently and rigidly held in exact concentric relation to its hub axis and in perfect form by the spokes which, therefore, may be laced into or attached to the felloe at any desired point of its width to give the desired lateral offset of rim and felloe relative to the line or lines of attachment of the spokes thereto and bring the vertical center line of tread into coincidence with the vertical load plane of the hub, as indicated by the line X—X of Fig. 5.

Prior to the present invention, it has been considered impractical to so offset, in a wire suspension wheel, the rim or its equivalent, relative to the line or lines of attachment of the spokes thereto, that is, to an extent sufficient to bring the tread and load planes into coincidence and make wire wheels exactly interchangeable as to vehicle tread width, with other types of wheels. In other words, a wire wheel which would withstand both lateral and load strains in use, has not previously been constructed by lacing or attaching all of the spokes to the rim, outside of the center line or tread plane of the rim, and this was due to inability to secure even distribution of spoke tension and to the method of construction practiced, wherein rim imperfections were sought to be corrected by spoke lacing tension. It is obvious, however, that if the tension of all spokes be equal under all conditions of use, spokes may be attached to rim or felloe as desired and any suitable form of lacing may be used with the spokes all attached to the rim outside of its center line as illustrated in Figs. 7, 8 and 9 and the rim will be properly held in its true tread and lateral planes, provided such rim is properly conditioned in accordance with the present method.

By this method, the spokes are all rigidly secured in place to form a rigid permanent connection between shell and rim while the rim is being held in a slightly contracted or re-formed condition and, therefore, upon release of the rim from its chuck, it will expand slightly and put all of the spokes under an even tension. Further, the heating of the spokes and adjacent portions of the hub causes them to lengthen and the hub to expand appreciably, and as these parts cool after the spokes are secured in place, they contract slightly, putting the spokes under further tension. As the rim has been forced by its chuck into proper form and alignment, the even tension of the spokes will hold it in that condition and the wheel will remain true in service as the spokes form a permanent rigid connection between the rim and hub shell and the even tension of the spokes will maintain that condition.

Even tension in wire wheel spokes under all service conditions is, however, also dependent upon the number of spokes in the rows relative to the lateral inclination or angle of the spokes in each row, and unless the wheel construction is such that such proportion may be secured, some of the spokes will be over-stressed in service. It is, therefore, essential that the proportion of the number of spokes in one row times the sine of the angle of these spokes, equal, as nearly as consistent with proper wheel construction, the number of spokes in the other row times the sine of the angle of the spokes in that row. When such proportion is substantially secured in the wheel lay out and equal initial spoke tension is secured through the method of assembly described, substantially perfect spoke tension is secured and maintained in service, and this regardless of the manner of lacing the spokes into the rim or the place of their connection to the rim. The rim, may, therefore, be offset relative to the hub, any desired distance as shown in Figs. 5 to 9 inclusive, thus not only securing interchangeability of the wire wheels with wheels of other types, but securing added strength due to bringing the load plane of the wheel into coincidence with the load plane of the hub which bears the proper relation to the hub bearings to properly carrry the load. Further, offsetting of the rim inwardly brings it well over the brake drum and the connection of the spokes to the rim at the outer side of its center line, leaves space at the inner side of the rim for brake mechanism, which is particularly advantageous where four-wheel brakes are employed, and especially so where balloon tires are used. Stock wheel rims are sufficiently rigid to take the load when supported adjacent one side only, and, therefore, if the initial tension and strains in service be the same in all spokes, the rim will be carried rigidly and accordingly whether offset or not, and as such equal spoke tension is secured through the emloyment of a wheel structure and the method of construction described, a wheel is secured which is very strong and rigid, which is interchangeable with other types, and which embodies features particularly adapting it to present day motor vehicle construction.

Having thus fully described my invention, what I claim is:—

1. The method of constructing suspension wheels which consists in locating hub and outer ring members relatively, contracting the outer ring member by pressure applied along its entire periphery to bring the same into concentric relation to said hub, securing the spokes in assembled position and in connecting relation with said outer ring member and hub member and while said outer ring member is so held in contracted condition, and then releasing said outer ring member to permit the same to expand and put said spokes under tension.

2. The method of constructing wire wheels which consists in locating, relatively, hub and rim members, contracting the rim member radially to a diameter less than the desired rim member diameter of the finished wheel and straightening the same laterally with the spokes in connecting relation between rim and hub members, securing the spokes in assembled position while said rim member is so held in contracted and straightened condition, and then releasing the rim member, whereby the spokes will be tensioned by the expansion of the rim member upon such release and hold the rim straight.

3. The method of constructing suspension wheels which consists in locating and holding the rim and hub members relatively, reconditioning the rim member to a substantially perfect circle and straightened laterally and holding the rim member in said position and condition, and then securing the spokes to the rim and hub members while so held.

4. The method of constructing suspension wheels which consists in locating, relatively, and holding, hub and rim members with spokes in position to connect said members, contracting the rim member by an even radial pressure applied throughout its periphery, heating one of said members and the adjacent spoke ends to expand the same and forming the heated spoke ends to secure the same to the member while the member is heated and while the rim member is held in contracted condition.

5. The method of constructing suspension wheels which consists in locating relatively, and holding, hub and rim members with spokes in position to connect said members, heating end portions of the spokes and adjacent portions of the hub member to expand the same and then forming said heated spoke ends to secure the same to said member and while said member is in expanded condition.

6. The method of constructing wire wheels which consists in locating and holding rim and hub members in concentric relation with spokes extending between said members, heating end portions of said spokes, and then forming laterally the said end portions of all of said spokes simultaneously to secure them to the members.

7. The method of constructing wire wheels which consists in locating and holding rim and hub members in concentric relation with spokes extending between said members with end portions of said spokes projecting through openings in one of the members, contracting and straightening laterally said rim member, heating said projecting end portions of said spokes, and then simultaneously clinching all of said heated end portions to secure the spokes to the member.

8. The method of constructing suspension wheels which consists in locating and holding rim and hub members relatively, placing a plurality of rows of spokes in position to connect the rim and hub members with said spokes at an angle to the load plane of the wheel and with the number of spokes in one row times the sine of the angle of the spokes in that row, substantially equal to the number of spokes in another row or rows times the sine of the angle of the spokes in said other row or rows, contracting said rim radially and then connecting said spokes and members with said spokes in tension.

9. The method of constructing suspension wheels which consists in locating and holding rim and hub members in concentric relation, with a plurality of rows of spokes in position to connect the rim and hub members with said spokes at an angle to the load plane of the wheel and with the number of spokes in one row times the sine of the angle of spokes in that row, substantially equal to the number of spokes in another row or rows times the sine of the angle of the spokes in said other row or rows, reconditioning the rim member to a substantially perfect circle of less diameter than the desired diameter of the finished wheel and straight laterally, and then securing the spokes to said rim and hub members.

10. The method of constructing suspension wheels which consists in locating and holding hub and rim members in concentric relation with a plurality of rows of spokes connected at their inner ends to the hub member adjacent the ends thereof and inclined laterally at an angle to the load plane of the wheel with the number of spokes in one row times the sine of the angle of the spokes in that row, substantially equal to the number of spokes in another row or rows times the sine of the angle of the spokes in said other row or rows, and with the outer ends of all of said spokes secured to the ring member laterally of the longitudinal center line of the said ring member, contracting said rim radially, securing said spokes to said hub and rim members while the rim is so held, and then releasing said rim to permit the rim to expand and place said spokes under substantially equal tension.

In testimony whereof I affix my signature.

CHARLES S. ASH.